US006965711B2

(12) United States Patent
Nakano et al.

(10) Patent No.: US 6,965,711 B2
(45) Date of Patent: Nov. 15, 2005

(54) LIGHT INTERCEPTING DEVICE AND OPTICAL SWITCH APPARATUS

(75) Inventors: Junichi Nakano, Hachioji (JP); Kenzi Murakami, Hino (JP); Daisuke Matsuo, Hachioji (JP); Ryouji Hyuuga, Kamiina-gun (JP); Michitsugu Arima, Kamiina-gun (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/915,046

(22) Filed: Aug. 10, 2004

(65) Prior Publication Data

US 2005/0041909 A1    Feb. 24, 2005

(30) Foreign Application Priority Data

Aug. 20, 2003   (JP) .............................. 2003-296036
Mar. 16, 2004   (JP) .............................. 2004-075089

(51) Int. Cl.[7] .............................. G02B 6/26; G02B 6/42
(52) U.S. Cl. .............................. 385/19; 385/22; 385/23
(58) Field of Search ..................................... 385/16–23

(56) References Cited

U.S. PATENT DOCUMENTS

| 5,226,099 | A | * | 7/1993 | Mignardi et al. | ............. 385/19 |
| 5,757,991 | A | * | 5/1998 | Harman | ....................... 385/16 |
| 2002/0131683 | A1 | | 9/2002 | Doerr | ........................... 385/19 |
| 2003/0201852 | A1 | * | 10/2003 | Eliacin et al. | ............... 333/262 |
| 2004/0208423 | A1 | * | 10/2004 | Klosowiak et al. | ........... 385/18 |

* cited by examiner

Primary Examiner—Frank G. Font
Assistant Examiner—Derek L. Dupuis
(74) Attorney, Agent, or Firm—Scully, Scott, Murphy & Presser

(57) ABSTRACT

A light intercepting device includes a movable portion allowed to swing about a support portion as a torsional axis, a shielding portion provided at an end portion of the movable portion in a direction perpendicular to the torsional axis, a driving wiring provided on the movable portion, and a magnetic field generator to apply a magnetic field to at least a part of the driving wiring in a direction perpendicular to the driving wiring. A position of the shielding portion is changed by power supply control for the driving wiring to control transmission and interception of space light.

33 Claims, 5 Drawing Sheets

LIGHT INTERCEPTING DEVICE AND
OPTICAL SWITCH APPARATUS

CROSS-REFERENCE TO RELATED
APPLICATIONS

This application is based upon and claims the benefit of priority from prior Japanese Patent Applications No. 2003-296036, filed Aug. 20, 2003; and No. 2004-075089, filed Mar. 16, 2004, the entire contents of both of which are incorporated herein by reference.

BACKGROUND OF THE INVENTION

1. Field of the Invention

The present invention relates to a light intercepting device, which controls transmission/interception of light, and an optical switch apparatus, which controls a traveling direction of a light signal using the device.

2. Description of the Related Art

U.S. Pat. No. 5,226,099 describes a shutter device (light intercepting device) for interrupting light signal transmission by use of a waveguide.

In the shutter device, a metal element constituting a movable portion is supported from a fixed pillar through a twisted beam (hinge), an address electrode is provided in the metal element, and a metal shutter is provided at a tip of the metal element. When voltage is applied to the address electrode, the metal electrode inclines by an electrostatic force, and a metal shutter portion is hung down into a gap of the waveguide provided in a lower part to intercept a light signal passing through the waveguide.

Such a shutter is used in turning on/off the light signal transmission, but an operation of the shutter needs to be sped up by increasing a rate of the information transmission. With an increase of an information transmission amount, waveguides are sometimes arranged in parallel in an array. In this case, to avoid enlargement of a whole information transmission line, the shutter is also desired to be miniaturized.

BRIEF SUMMARY OF THE INVENTION

An aspect of the present invention is directed to a shutter device (light intercepting device). The light intercepting device of the present invention comprises a movable portion allowed to swing about a support portion as a torsional axis, a shielding portion provided at an end portion of the movable portion in a direction perpendicular to the torsional axis, a driving wiring provided on the movable portion, and a magnetic field generator to apply a magnetic field to at least a part of the driving wiring in a direction perpendicular to the driving wiring. A position of the shielding portion is changed by power supply control for the driving wiring to control transmission and interception of space light.

Another aspect of the present invention is directed to an optical switch apparatus. The optical switch apparatus of the present invention comprises a movable portion allowed to swing about a support portion as a torsional axis, a shielding portion provided at an end portion of the movable portion in a direction perpendicular to the torsional axis, a driving wiring provided on the movable portion, a magnetic field generator to apply a magnetic field to at least a part of the driving wiring in a direction perpendicular to the driving wiring, an input-side light waveguide, first and second output-side light waveguides connected to the input-side light waveguide, and first and second gaps provided in the first and second output-side light waveguides. The shielding portion is allowed to go into and out the first and second gaps, so that traveling of a light signal from the input-side light waveguide to the output-side light waveguide is controlled by power supply control for the driving wiring.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL
VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE
INVENTION

Embodiments of the present invention will be described hereinafter with reference to the drawings.

First Embodiment

Figure 1:
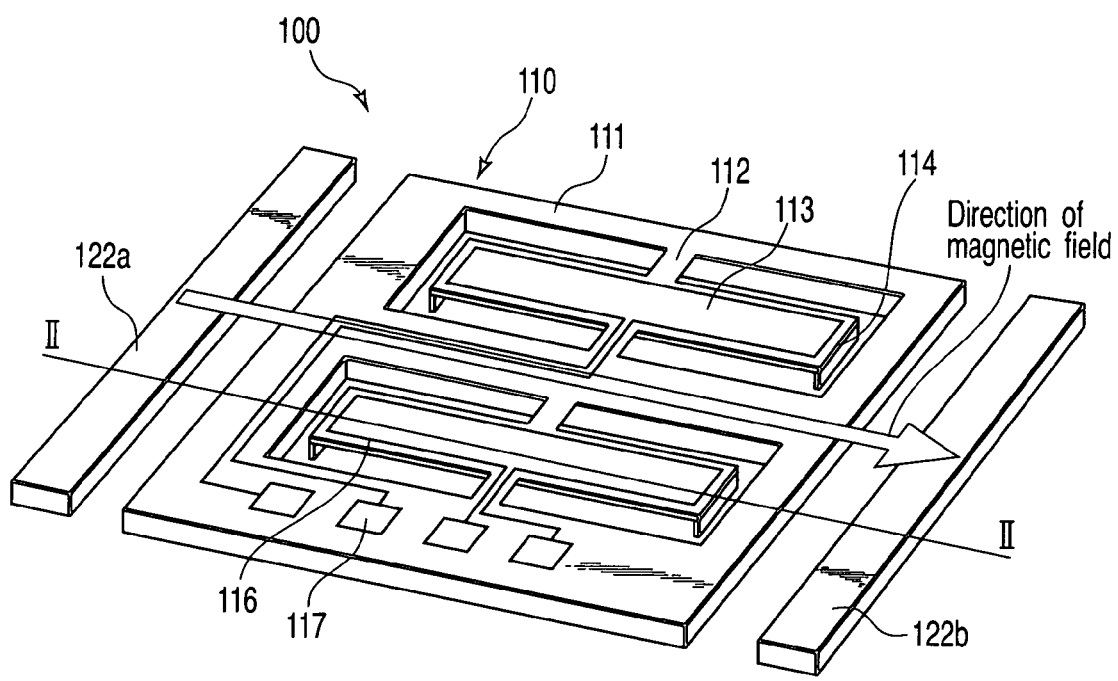
FIG. 1 shows a constitution of a light intercepting device according to a first embodiment of the present invention.

The present embodiment is directed to a light intercepting device for switching transmission and interception of light. FIG. 1 shows a constitution of the light intercepting device according to the first embodiment of the present invention.

As shown in FIG. 1, a light intercepting device 100 of the present embodiment includes a movable plate structure 110, and two magnets 122a and 122b as a magnetic field generator. The movable plate structure 110 includes a frame 111, two hinges 112 as a support portion, each of which has one end connected to the frame 111, a movable plate 113 connected to the other end of the each hinge 112, and two shielding plates 114 provide at both ends of the movable plate 113. The shielding plates 114 extend substantially perpendicular to the upper surface of the movable plate 113. In the present specification, "substantially perpendicular" means precisely perpendicular and nearly perpendicular. The movable plate structure 110 includes a driving wiring 116 provided on the upper surface of the movable plate 113, and pads 117 for electrically connecting the driving wiring 116 to the outside. The driving wiring 116 is a conductive line, and passes through one of the hinges 112, extends to the frame 111, and is connected to the pads 117.

Here, drawing-out of the wiring from the pads 117 to the outside is not especially shown, but, needless to say, various manners such as a flexible substrate and a lead wire can be applied, and a method of directly connecting a flexible substrate directly to the pads on the frame by wire bonding, anisotropic conductive film or the like is useful especially in that an integration degree is enhanced.

The movable plate 113 is supported by the hinges 112 so as to be allowed to swing about the hinges 112 as a torsional axis. The shielding plates 114 extend in parallel to a common central axis of the hinges 112. Two magnets 122a and 122b are located at both sides of the movable plate structure 110 perpendicular to the central axis of the hinges 112. Two magnets 122a and 122b produce a magnetic field that is parallel to the upper surface of the movable plate structure 110.

The magnetic field is formed by two magnets 122a and 122b in a direction connecting both magnets. Since the driving wiring 116 has a portion perpendicular to the magnetic field, the movable plate 113 can be inclined about the hinges 112 by Lorentz force by supplying a current to the driving wiring 116.

Figure 2:
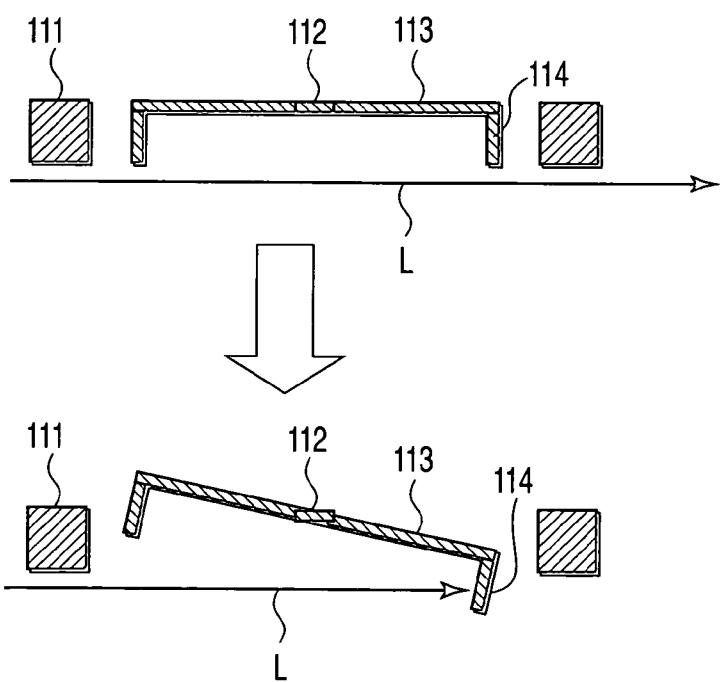
FIG. 2 is a sectional view of the light intercepting device along line II—II shown in FIG. 1.

FIG. 2 is a sectional view of the light intercepting device 100 along line II—II shown in FIG. 1. In a state in which any current is not supplied to the driving wiring 116, as shown on an upper side of FIG. 2, the movable plate 113 is not inclined, so that light L traveling in a lower part of the light intercepting device 100 passes without being intercepted by some member. When the current is supplied to the driving wiring 116, as shown on a lower side of FIG. 2, the movable plate 113 inclines, so that a shielding plate 114 moves below the frame 111. Therefore, the light L that travels in the lower part of the light intercepting device 100 is intercepted by the shielding plates 114.

That is, by turning on/off the current to be supplied to the driving wiring 116 through the pads 117, the interception/transmission of the light can be controlled.

Next, a method of manufacturing the movable plate structure 110 of the light intercepting device 100 of the present embodiment will be described. The movable plate structure 110, that is, the frame 111, hinges 112, movable plates 113, shielding plates 114, driving wiring 116, and pads 117 are prepared by processing of a silicon substrate by a technique of a micro electro-mechanical system (MEMS). For example, a polyimide film is formed on a silicon substrate, a driving wiring is formed of Al or the like on the polyimide film, thereafter an unnecessary portion is removed, and accordingly movable plate structures 110 shown in FIG. 1 can be easily prepared collectively. In the movable plate structure 110 prepared in this manner, the frame 111, movable plates 113, and shielding plates 114 are made from silicon, and the hinges 112 are made from polyimide.

In the light intercepting device 100 of the present embodiment, since the hinges 112 are twisted to incline and support the movable plates 113, the hinges 112 need to be easily twisted. In the present embodiment, since the hinges 112 are formed of polyimide, the movable plate 113 is allowed to incline largely, even if hinges 112 are short. As a result, the hinges 112 can be miniaturized, so that the light intercepting device can also be miniaturized.

Moreover, since the light intercepting device 100 of the present embodiment is driven by an electromagnetic force, that is, Lorentz force, a driving force can be easily enhanced by selection of the magnet 122 or supply of a large current into the driving wiring 116. As a result, the movable plates 113 and shielding plates 114 can be moved at a high speed, and a shutter operation can be speeded up. Further in the light intercepting device 100 of the present embodiment, since the shielding plates 114 are provided at the both ends of the movable plate 113, movable portions are symmetrically formed with respect to the hinge 112. Therefore, a current amount for holding the plates at fixed positions after moving the shielding plates 114 at the high speed may be comparatively small. Although the high-speed driving is possible, whole power consumption is small. Since it is sufficient that a driving current of approximately 100 mA is supplied to a driving wiring of several tens of ohms at most, a voltage necessary for the driving may be about several volts, and the apparatus can be driven from an inexpensive amplifier.

It is to be noted that polyimide is especially preferable for the material of the hinge portion in a low elasticity modulus and a high heat resistance, but the other materials inferior in properties may also be applied. Examples of the material are considered to include materials processable in thin films for MEMS, such as Si and Si compound, various metal films of aluminum and the like, fluorine-based resist, acrylate-based photoresist, and silicone resist.

As described above, according to the present embodiment, in the light intercepting device in which the movable plate is swung about the torsional axis to intercept the light by the shielding portion provided at the end portion of the movable portion, the driving wiring is provided on the movable portion, the driving is performed by the Lorentz force between the wiring and the magnet positioned in the outside, therefore a large-sized driving electrode does not have to be disposed, and the light intercepting device can be miniaturized. Since the Lorentz force is incomparably larger than the electrostatic force, the high-speed driving is possible, and an operation time can be shortened. Furthermore, since the driving at a voltage of several volts is possible, it is possible to reduce cost of the light intercepting device including the driving circuit.

Therefore, according to the present embodiment, there are provided a light intercepting device or a shutter device in which high-speed driving is possible even with a small size and whose cost can be reduced including a driving circuit.

It is to be noted that in the present embodiment, the shielding plates 114 are provided at the both ends of the movable plate 113, but only one shielding plate may also be provided only at one side. Additionally, in consideration of a symmetric property, similar shielding plates are preferably provided at the both ends. When the shielding plates are provided at the both ends, the two shielding plates may also be constituted to control the transmission and interception of two light beams, respectively.

Moreover, the surface of the shielding plate 114 may also be processed to reduce light reflectance, or remains to be a flat surface (mirror surface) if not necessary.

Furthermore, in FIG. 1, two driving wirings are drawn out of one hinge, but each wiring may also be drawn out of each of two hinges. In this case, an effect is obtained that strengths of hinges including the driving wiring are balanced on the both sides.

Second Embodiment

Figure 3:
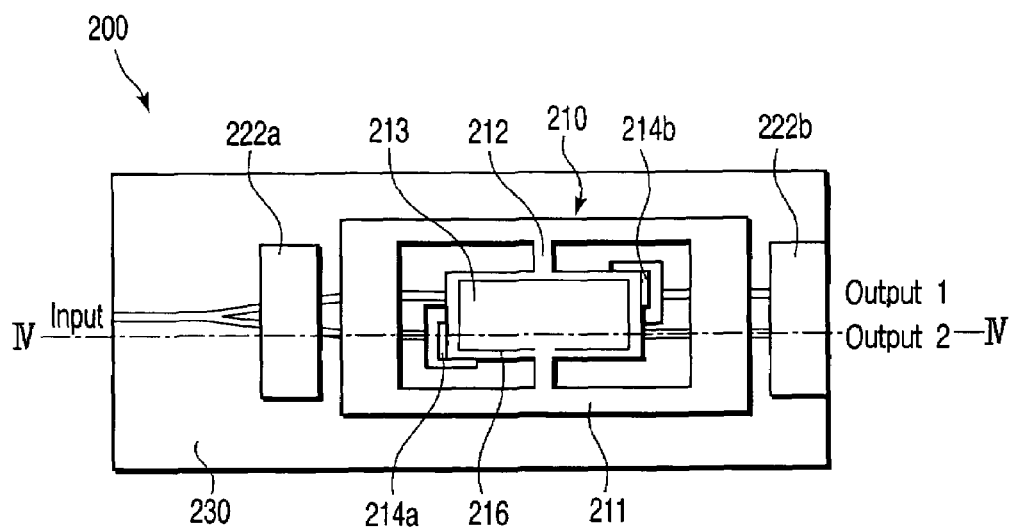
FIG. 3 is a top view of an optical switch apparatus of a second embodiment of the present invention.
Figure 4:
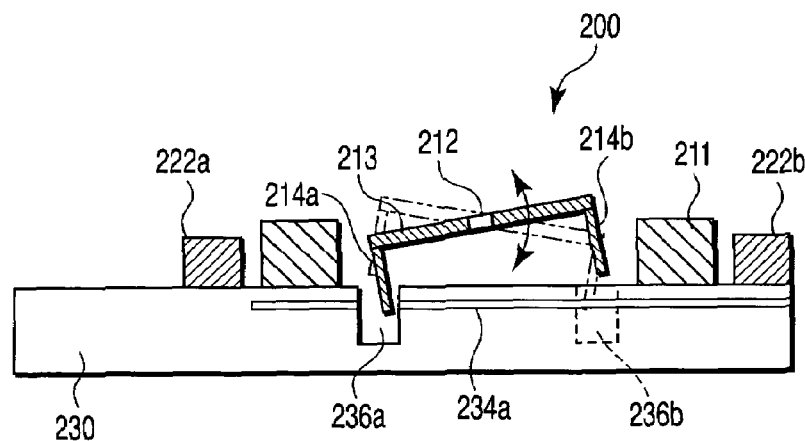
FIG. 4 is a sectional view of the optical switch apparatus along line IV—IV shown in FIG. 3.
Figure 5:
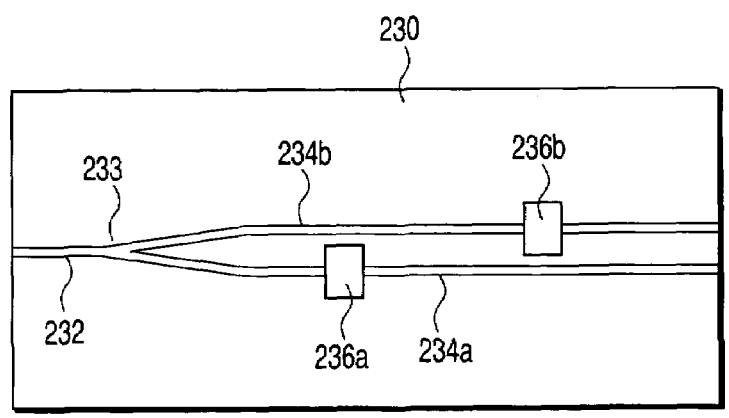
FIG. 5 is a top view of a light waveguide substrate shown in FIG. 3.
Figure 6:
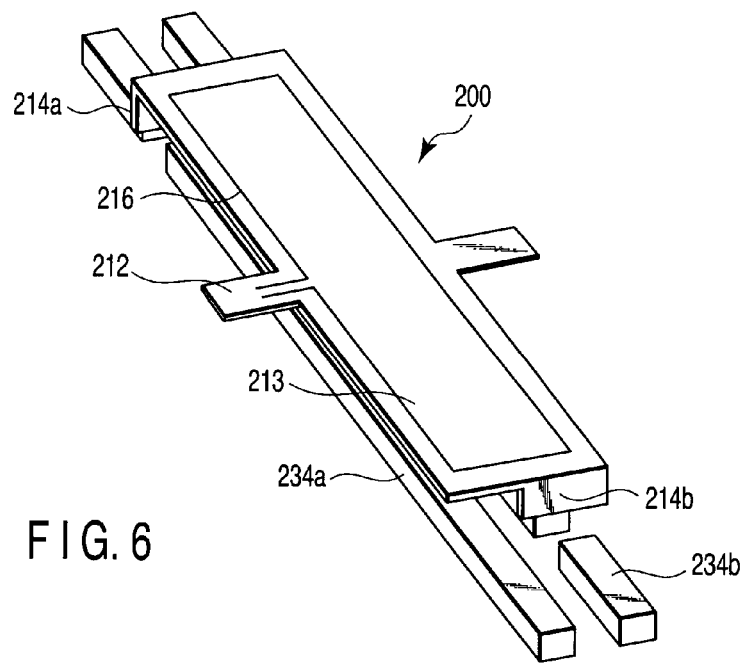
FIG. 6 is a perspective view of a main part of the optical switch apparatus shown in FIG. 3.

The present embodiment is directed to an optical switch apparatus that selectively switches light to either of two outputs from one input. FIGS. 3 to 6 show an optical switch apparatus of a second embodiment of the present invention. FIG. 3 is a top view of the optical switch apparatus of the second embodiment of the present invention. FIG. 4 is a sectional view of the optical switch apparatus along line IV—IV shown in FIG. 3. FIG. 5 is a top view of a light waveguide substrate shown in FIG. 3. FIG. 6 is a perspective view of a main part of the optical switch apparatus shown in FIG. 3.

As shown in FIG. 3, an optical switch apparatus 200 of the present embodiment includes a movable plate structure 210, two magnets 222a and 222b, and a light waveguide substrate 230. The movable plate structure 210 includes a substantially rectangular movable plate 213, a frame 211, which surrounds the movable plate 213, a pair of hinges 212, which connect the movable plate 213 to the frame 211, and shielding plates 214a and 214b. The hinges 212 are twistable/deformable, so that the movable plate 213 is supported by the hinges 212 so as to be allowed to swing about the hinges 212 as a torsional axis.

The movable plate structure 210 further includes a driving wiring 216 extending around a peripheral edge portion of the movable plate 213, and the driving wiring 216 extends to the frame 211 through the hinges 212, and is connected to pads (not shown) provided on the frame 211. The movable plate structure 210 is similar to the movable plate structure 110 described in the first embodiment, the function is also similar, and therefore detailed description is omitted here.

As shown in FIG. 5, the light waveguide substrate 230 includes one input-side light waveguide 232, and two output-side light waveguides 234a and 234b. The input-side light waveguide 232 is connected to the output-side light waveguides 234a and 234b in a branch 233. In other words, the input-side light waveguide 232 is branched like Y-shape into the output-side light waveguides 234a and 234b in the branch 233.

Furthermore, the light waveguide substrate 230 includes a gap 236a that crosses the output-side light waveguide 234a, and a gap 236b that crosses the output-side light waveguide 234b. As shown in FIG. 4, both the gaps 236a and 236b are concave dents. Therefore, the output-side light waveguide 234a is interrupted in a portion of the gap 236a. That is, the output-side light waveguide 234a is spatially separated by the gap 236a. Similarly, the output-side light waveguide 234b is spatially separated by the gap 236b.

As shown in FIG. 4, both the shielding plates 214a and 214b extend substantially perpendicular to the upper surface of the movable plate 213. Furthermore, both the shielding plates 214a and 214b extend in parallel to the axis of the hinge 212. As shown in FIGS. 3 and 6, each of the shielding plates 214a and 214b is provided at a part of the end portion of the movable plate 213. That is, the shielding plate 214a or 214b is smaller than a width of the movable plate 213 in a torsional axial direction. The shielding plates 214a and 214b are positioned above the output-side light waveguides 234a and 234b, respectively.

As described above, the movable plate 213 is allowed to swing about the hinges 212 as the torsional axis. When the current is supplied to the driving wiring 216 in the same manner as in the first embodiment, the movable plate 213 can be inclined about the hinges 212 by Lorentz force. Therefore, the shielding plates 214a and 214b can be detachably inserted into the gaps 236a and 236b.

Subsequently, an operation of the optical switch apparatus of the present embodiment will be described.

A light signal that has traveled from the input-side light waveguide 232 is branched into two in the branch 233 provided in the light waveguide substrate 230, and travels in each of the output-side light waveguides 234a and 234b to reach the gaps 236a and 236b.

Here, when an appropriate current is passed through the driving wiring 216 to incline the movable plate 213 counterclockwise as shown in FIG. 4, the shielding plate 214a enters the gap 236a. Conversely, the shielding plate 214b goes out of the gap 236b. Therefore, the light signal passing through the output-side light waveguide 234a is intercepted by the shielding plate 214a, but the light signal passing through the output-side light waveguide 234b can pass through the gap 236b, and therefore the light signal is transmitted toward output 1 from input in FIG. 3.

Conversely, when the supply current to the driving wiring 216 is reversed, the movable plate 213 is inclined clockwise. Next, since the shielding plate 214b intercepts the light of the output-side light waveguide 234b, the light signal is transmitted toward output 2 from input.

Therefore, a one-input two-outputs optical switch apparatus capable of selecting the light waveguide to which the light signal is output by control of power supply into the driving wiring 216 is realized.

In the optical switch apparatus of the present embodiment, since optical components such as a lens and a prism are unnecessary, the number of members is small, and an optical switch apparatus that does not require positional adjustment of the optical components can be realized. Since the light signal is alternately turned on/off by the shielding plates provide at the both ends of the movable plate in a complementary manner, the transmission and interception of the light signal with respect to two light waveguides can be controlled by the movable portion, and an optical switch apparatus having a very simple constitution can be realized.

Moreover, since a longitudinal direction of the light waveguide substrate is the same as that of the movable plate and the frame in the optical switch apparatus of the present embodiment, the optical switch apparatus can be easily miniaturized. Since the shielding plate 214a or 214b is provided only on about the half of the end portion of the movable plate 213 in the optical switch apparatus of the present embodiment, the light waveguide does not have to be diverted to avoid the movable plate, and this also results in miniaturization, or facilitation of manufacturing.

It is to be noted that in the present embodiment, the light waveguide is branched into two, but the number of branches may also be increased to realize a 1×n optical switch. An optical switch capable of optionally turning on/off each output may also be realized at one-input n-outputs by providing a movable plate and a shielding plate independently for each of branched output-side light waveguides. In this manner, various modifications are considered in disposing the light waveguide and the movable plate/shielding plate.

Moreover, the light that has traveled in the light waveguide is intercepted in the gap in the present embodiment, but, needless to say, a modification is also possible in which a shielding plate is provided for light projected from an optical fiber or parallel light traveling in space to realize an optical switch apparatus.

Figure 7:
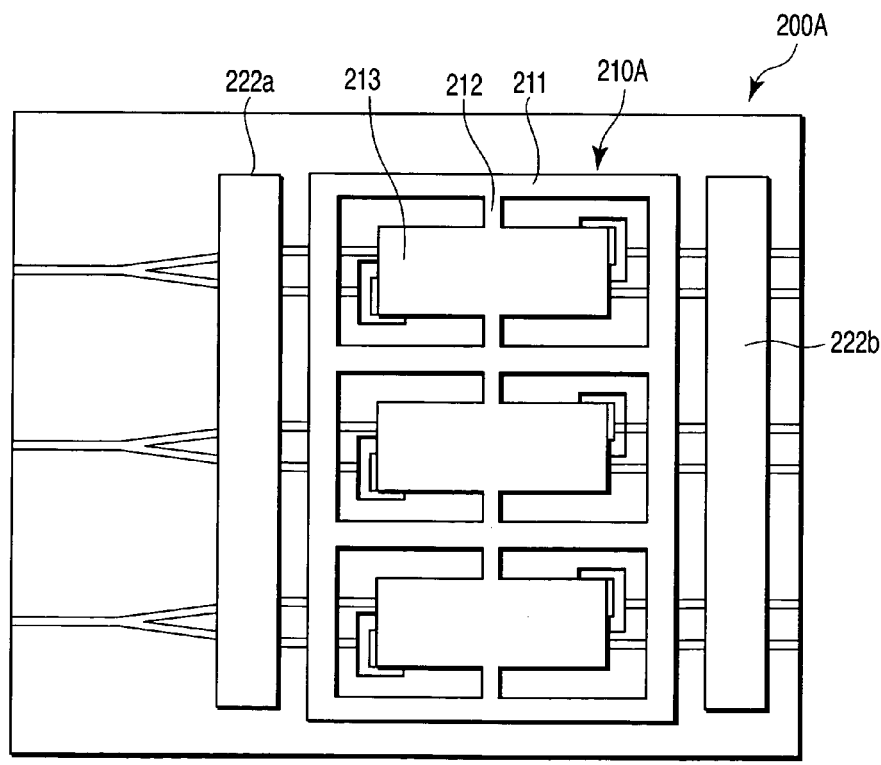
FIG. 7 shows a multi-channel optical switch apparatus in which the optical switch apparatus shown in FIG. 3 is used.

Furthermore, the optical switch apparatus of the present embodiment can be easily expanded to a multi-channel optical switch apparatus having an array form. FIG. 7 shows an example in which one-input two-outputs switches are arranged in parallel for three channels. As shown in FIG. 7, an optical switch apparatus 200A includes three optical switch apparatuses shown in FIG. 3. That is, a movable plate structure 210A includes three movable plates 213. The movable plate structure 210A includes a constitution in which three movable plate structures 210 are arranged in an array, and can be easily prepared by use of MEMS technique in the same manner as in the movable plate structure 210. Since the light waveguide substrate and the magnet are simply enlarged, the number of components does not increase even in a case where the channels are multiplied. Therefore, the multi-channel optical switch apparatus can be realized at low cost with a simple structure. Since the movable plate 213 is driven by current supply into the driving wiring 216 in an electromagnetic driving system, a necessary driving voltage can be lowered in the same manner as in the first embodiment. Therefore, even when the driving circuit is included, a very inexpensive multi-channel optical switch apparatus can be provided.

Third Embodiment

Figure 8:
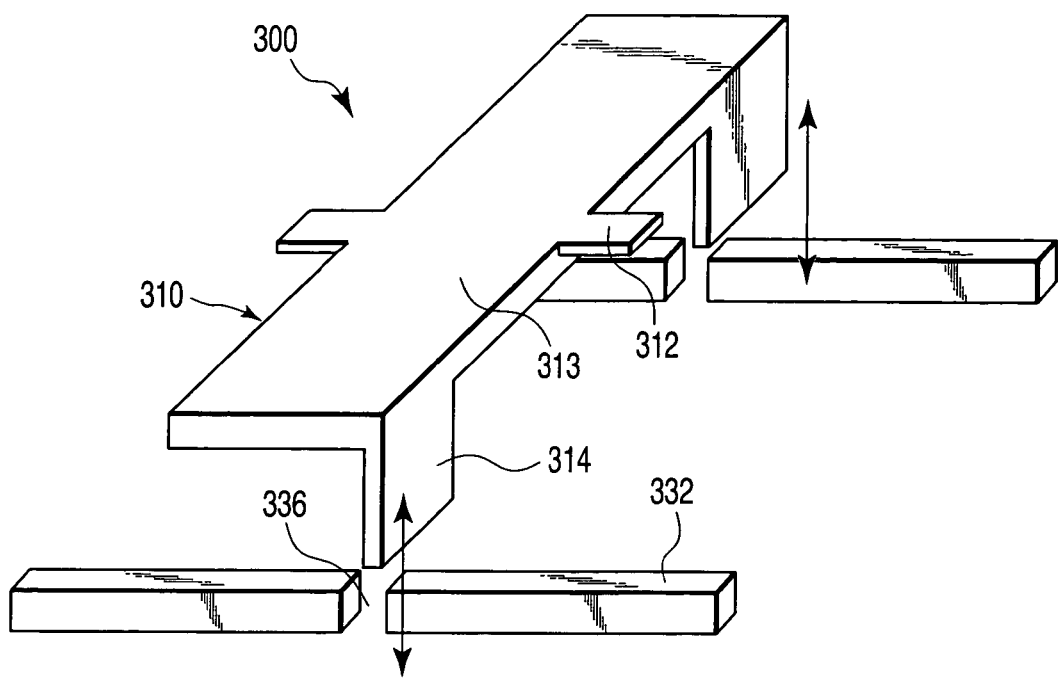
FIG. 8 is a perspective view showing the main part of the optical switch apparatus of a third embodiment of the present invention.

The present embodiment is directed to an optical switch apparatus that selectively switches light to either of two outputs from one input in the same manner as in the second embodiment. FIG. 8 is a perspective view showing the main part of an optical switch apparatus 300 of the present embodiment.

As shown in FIG. 8, the optical switch apparatus 300 of the present embodiment includes a movable plate structure 310, two magnets (not shown), and two light waveguides 332 provided on a light waveguide substrate (not shown). Gaps 336 are provided at the same positions in two light waveguides 332.

The movable plate structure 310 includes a substantially rectangular movable plate 313, a pair of hinges 312 symmetrically extending to the outside from middle portions of long sides, and two shielding plates 314 provided at both end portions of the movable plate 313. The hinges 312 are twistable/deformable, so that the movable plate 313 is supported by the hinges 312 so as to be allowed to swing about the hinges 312 as a torsional axis.

The movable plate structure 310 further includes a driving wiring (not shown) extending around a peripheral edge portion of the movable plate 313. The driving wiring extends to a frame (not shown) through the hinges 312, and is connected to pads (not shown) provided on the frame.

Since the movable plate structure 310 is similar to the movable plate structure 110 described in the first embodiment, and also has a similar function, detailed description is omitted here.

In the optical switch apparatus 300 of the present embodiment, two shielding plates 314 extend substantially perpendicular to the upper surface of the movable plate 313, and additionally extend perpendicular to the axis of the hinge 312. That is, in the optical switch apparatus 300 of the present embodiment, the directions of the shielding plates 314 differ by 90 degrees in comparison with the second embodiment.

Therefore, when the movable plate 313 is swung about the axis of the hinge 312, angles formed by the shielding plates 314 and the light waveguides 332 do not change. Accordingly, a dimension of the gap 336 can be reduced as compared with the second embodiment. When the gap 336 is narrowed, loss of a light signal passing through the gap is reduced. Therefore, as compared with the second embodiment, an optical switch apparatus having a less loss is realized.

In the present embodiment, the magnet is preferably extended in a direction perpendicular to the light waveguide in the same manner as in the second embodiment, and a direction of a magnetic field is parallel to the light waveguide. In this arrangement, an increase of the number of components in an arrayed layout or an increase of space can be avoided.

Moreover, in the present embodiment, the shielding plates 314 are provided at one side (right side in FIG. 8) of the end portion of the movable plate 313, but the position is not limited as long as the shielding plates 314 have the same direction. For example, when the shielding plates are provided at middles of the end portions of the movable portion, a balance can be improved.

Since a longitudinal direction of the movable plate 313 is perpendicular to the light waveguide 332, the constitution of the present embodiment is not suitable for miniaturization. The constitution of the second embodiment or the present embodiment may be appropriately selected in accordance with required specifications.

Fourth Embodiment

Figure 9:
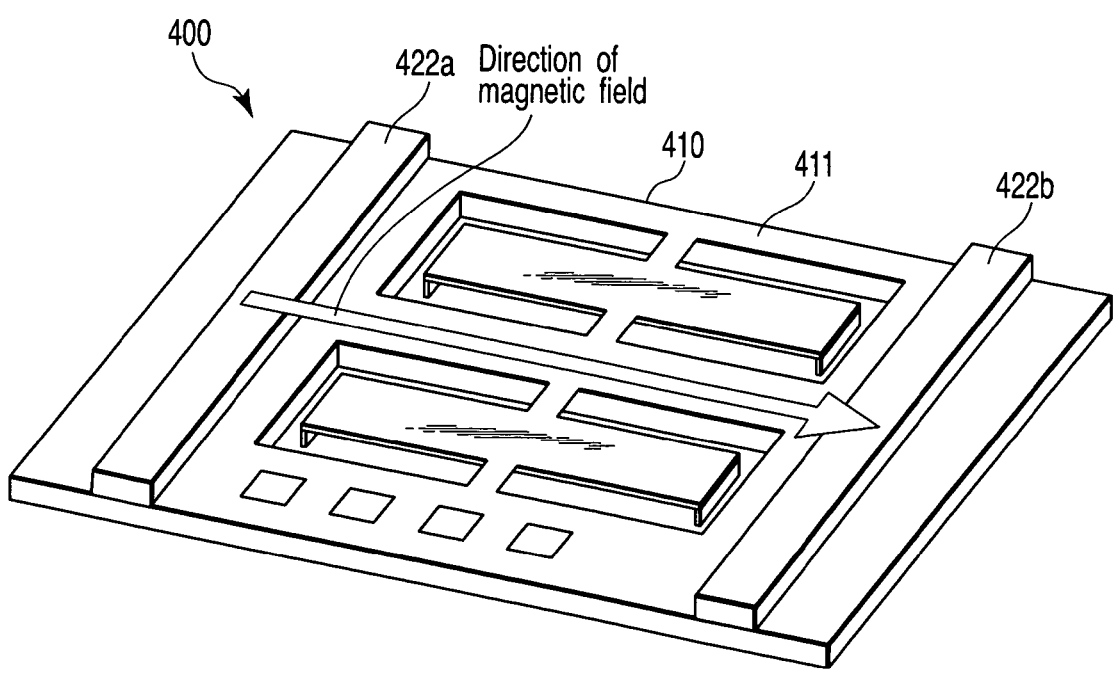
FIG. 9 shows a constitution of the light intercepting device of a fourth embodiment of the present invention.

The present embodiment is directed to a light intercepting device for switching transmission and interception of light. FIG. 9 shows a constitution of the light intercepting device of a fourth embodiment of the present invention.

As shown in FIG. 9, a light intercepting device 400 of the present embodiment includes a movable plate structure 410 and magnets 422a and 422b as a magnetic field generator. The movable plate structure 410 includes a structure similar to that of the first embodiment including a frame 411 as a fixed portion, and therefore detailed description is omitted.

Here, the frame 411 is constituted to be large-sized as compared with the frame 111 of the first embodiment, and the magnets 422a and 422b are fixed to the frame 411. Accordingly, the light intercepting device of the present embodiment includes the movable plate structure integrated with the magnets, and can be handled as one device.

As compared with the first embodiment, in the present embodiment, a magnetic field between the magnets is slightly apart from the movable plate and the driving wiring in a height direction, but a magnetic field also exists in a position other than a shortest path between the magnets. Moreover, since a leak magnetic flux also exists around each magnet, any trouble is not caused in driving the movable plate.

In this manner, according to the present embodiment, since the magnets are provided on the frame, the members constituting the light intercepting device are integrated, and the device is miniaturized, and is easily handled. Needless to say, the device may also be combined with the light waveguide substrate to constitute an optical switch apparatus as in the second or third embodiment, and also in this case, the device is easily handled at a time of assembling. Since an attracting force between the magnets is supported by the frame, an influence of the attracting force on the light waveguide substrate (e.g., force that functions to bend the light waveguide substrate) is reduced.

Figure 10:
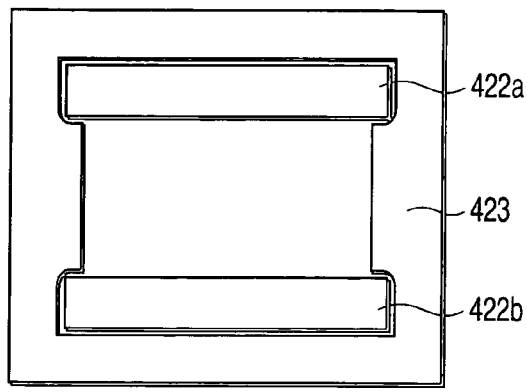
FIG. 10 shows a constitution around a magnet of a fourth embodiment of the present invention.

Moreover, to mount magnets on a thin frame, preferably as shown in FIG. 10, the magnets 422a and 422b may be fixed by a holder 423. In other words, the light intercepting device may further include the holder 423 for fixing the magnets 422a and 422b. In this case, a magnetic field generator comprises the magnets 422a and 422b and the holder 423. The holder 423 may include convex portions between the magnets as a portion to hold an interval between the magnets 422a and 422b. In this constitution, the attracting force between the magnets is supported by the holder, and the force is not added to the frame.

Figure 11:
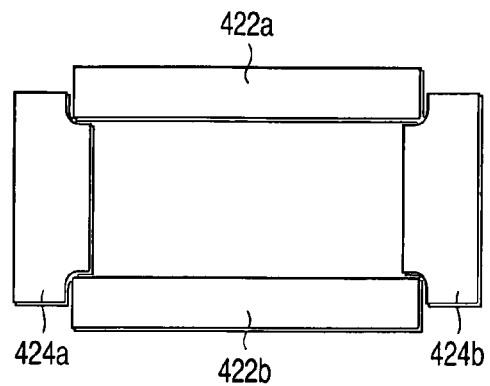
FIG. 11 shows a constitution around the magnet according to one modification of the fourth embodiment of the present invention.

The holder 423 may also have any shape as long as the interval between the magnets 422a and 422b can be held, but may preferably include the convex portion between the magnets as shown in FIG. 10. In this case, the holder 423 is capable of more securely supporting the attracting force between the magnets. The holder for fixing the magnets 422a and 422b is not limited to the peripherally provided holder 423 shown in FIG. 10, and may also be constituted of two holders 424a and 424b as shown in FIG. 11.

It is to be noted that examples of a material of the holder include a resin such as polycarbonate, the holder can be easily produced by molding, and the material is preferable in processability, heat resistance, environment resistance, strength, and cost, but various resin materials such as acryl, styrene, and glass epoxy are also useful. Furthermore, metal materials such as aluminum, copper, and brass, ceramics such as alumina and silicon, inorganic materials and the like are also applicable. In this case, when Si is used in the frame, a coefficient of linear expansion of the holder becomes close to that of the frame, the constitution has higher reliability. Additionally, since magnetic materials such as iron and stainless steel have strong influence on the magnetic field, a magnetic circuit needs to be carefully studied.

Fifth Embodiment

Figure 12:
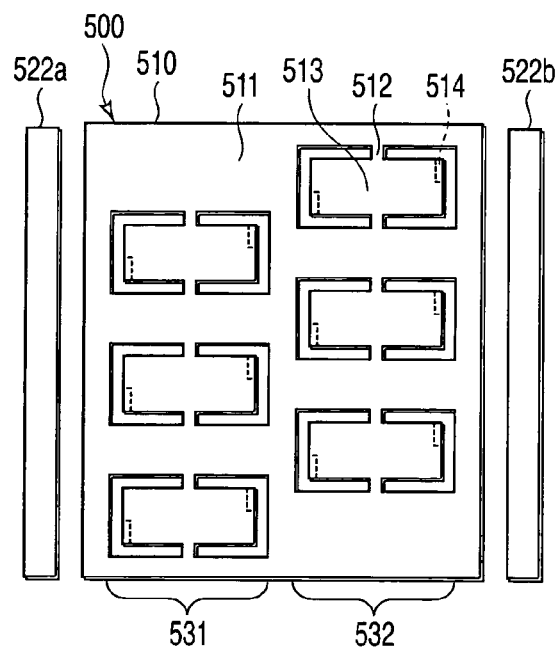
FIG. 12 shows a constitution of the light intercepting device of a fifth embodiment of the present invention.

The present embodiment is directed to a light intercepting device for switching transmission and interception of light. FIG. 12 shows a constitution of the light intercepting device of a fifth embodiment of the present invention.

As shown in FIG. 12, a light intercepting device 500 of the present embodiment includes a movable plate structure 510, and magnets 522a, 522b as a magnetic field generator. Since an operation of the light intercepting device 500 is similar to that of each of the above-described embodiments, detailed description is omitted.

In the movable plate structure 510, hinges 512, movable plates 513, and shielding plates 514 are arranged in two rows as a movable plate group 531 or a first movable plate group and a movable plate group 532 of a second movable plate group. In the movable plate groups 531 and 532, the included movable plates 513 are allowed to swing about axes that are substantially parallel to each other, and the included movable plates 513 or shielding plates 514 shift from each other by a half pitch, and arranged in a staggered manner. In the present specification, a term "pitch" means a central interval between two adjacent movable plates in a movable plate group. That is, the movable plate groups 531 and 532 have the same central interval, and are shifted by a half of the central interval. In the present specification, a term "substantially parallel" means precisely parallel and nearly parallel. Therefore, combination with a light waveguide substrate including a denser arrangement for space lights or a core arrangement at a denser pitch is possible, and further miniaturization/integration of the light intercepting device is possible.

Figure 13:
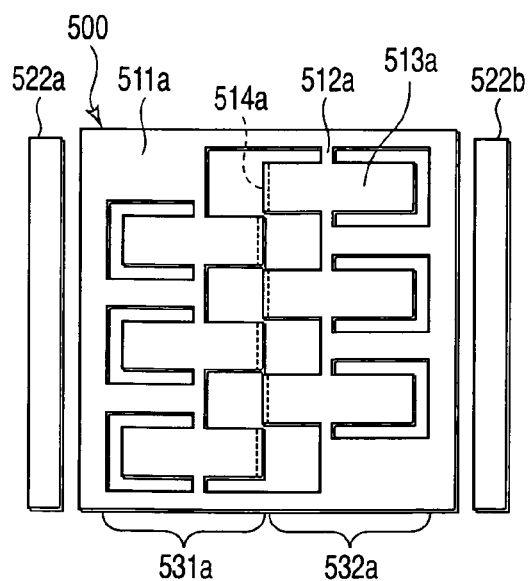
FIG. 13 shows a constitution of the light intercepting device according to one modification of the fifth embodiment of the present invention.

It is to be noted that in the arrangement of FIG. 12, the positions of the shielding plates are slightly apart from each other. However, when the shielding plates need to be densely arranged, as shown in FIG. 13, the shape of a frame 511a can be devised to dispose a movable plate group 531a further near a movable plate group 532a. By the arrangement, a shielding plate array or a shutter array can be realized in which shielding plates 514a are aligned substantially linearly in a row at little interval. In the present specification, a term "substantially linear" means precisely linear and nearly linear. It is to be noted that in the constitution of FIG. 13, a shielding plate 514a is provided only at one end of the movable plate 513a, therefore the movable plate 513a on a side at which the shielding plate 514a is not provided is constituted to be longer, and the arrangement is balanced with respect to a hinge 512a.

In this manner, according to the present embodiment, since the movable plates are arranged in two rows in a staggered manner, a distance between the shielding plates can be reduced, and further miniaturization/integration is possible.

The embodiments of the present invention have been described above with reference to the drawings, but the present invention is not limited to these embodiments, and various modifications or alterations are possible without departing from the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A light intercepting device comprising:
a movable portion allowed to swing about a support portion as a torsional axis;
first and second shielding portions respectively provided at both ends of the movable portion at least one of the first and second shielding portions is in a direction perpendicular to the torsional axis;
a driving wiring provided on the movable portion; and
a magnetic field generator to apply a magnetic field to at least a part of the driving wiring in a direction perpendicular to the driving wiring,
a position of at least one of the first and second shielding portions being changed by power supply control for the driving wiring to control transmission and interception of space light traveling in the direction perpendicular to the torsional axis.

2. The light intercepting device according to claim 1, wherein the movable portion and the shielding portions are made from silicon.

3. The light intercepting device according to claim 2, wherein the support portion is made from polyimide.

4. The light intercepting device according to claim 1, further comprising a fixed portion connected to the support portion, wherein the magnetic field generator is provided on an upper surface of the fixed portion.

5. The light intercepting device according to claim 4, wherein the magnetic field generator comprises a magnet, and a holder to hold the magnet.

6. The light intercepting device according to claim 4, wherein the magnetic field generator comprises at least two magnets, and a holder to hold the magnets, and the holder includes at least one convex portion between the at least two magnets to hold an interval between the at least two magnets.

7. The light intercepting device according to claim 1, comprising: a first movable portion group including support portions, movable portions, shielding portions, and driving wirings, the movable portions being allowed to swing about a first axis; and a second movable portion group including support portions, movable portions, shielding portions, and driving wirings, the movable portions being allowed to swing about a second axis parallel to the first axis.

8. The light intercepting device according to claim 7, wherein some shielding portions included in the first movable portion group and some shielding portions included in the second movable portion group are linearly arranged.

9. The light intercepting device according to claim 1, wherein the movable portions and the shielding portion are made from silicon.

10. The light intercepting device according to claim 9, wherein the support portion is made from polyimide.

11. The light intercepting device according to claim 1, further comprising a fixed portion connected to the support portion, wherein the magnetic field generator is provided on an upper surface of the fixed portion.

12. The light intercepting device according to claim 11, wherein the magnetic field generator comprises a magnet, and a holder to hold the magnet.

13. The light intercepting device according to claim 11, wherein the magnetic field generator comprises at least two magnets, and a holder to hold the magnets, and the holder includes at least one convex portion between the at least magnets to hold an interval between the at least two magnets.

14. The light intercepting device according to claim 1, comprising: a first movable portion group including support portions, movable portions, shielding portions, and driving wirings, the movable portions being allowed to swing about a first axis; and a second movable portion group including support portions, movable portions, shielding portions, and driving wirings, the movable portions being allowed to swing about a second axis parallel to the first axis.

15. The light intercepting device according to claim 14, wherein the shielding portions included in the first movable portion group, and the shielding portions included in the second movable portion group are linearly arranged.

16. An optical switch apparatus comprising:
a movable portion allowed to swing about a support portion as a torsional axis;
two shielding portions respectively provided at both ends of the movable portion in a direction perpendicular to the torsional axis;
a driving wiring provided on the movable portion;
a magnetic field generator to apply a magnetic field to at least a part of the driving wiring in a direction perpendicular to the driving wiring;
an input-side light waveguide;
first and second output-side light waveguides connected to the input-side light waveguide, the first and second output-side light waveguides allowing light signals to travel in the direction perpendicular to the torsional axis; and
first and second gaps provided in the first and second output-side light waveguides,
wherein one of the two shielding portions provided at one of the both ends being allowed to go into and out of the first gap, and another of the two shielding portions provided at the other of the both ends being allowed to go into and out the second gap, so that the traveling of the light signal from the input-side light waveguide to the first output-side light waveguide and the traveling of the light signal from the input-side light waveguide to the second output-side light waveguide are selectively performed by a power supply control for the driving wiring.

17. The optical switch apparatus according to claim 16, wherein the shielding portions extend from the movable portion perpendicular to the movable portion, and the surfaces of the shielding portions are parallel to the torsional axis.

18. The optical switch apparatus according to claim 17, wherein the shielding portions have a width smaller than that of the movable portion along the torsional axis.

19. The optical switch apparatus according to claim 16, wherein the movable portion and the shielding portion are made from silicon.

20. The optical switch apparatus according to claim 19, wherein the support portion is made from polyimide.

21. The optical switch apparatus according to claim 16, further comprising a fixed portion connected to the support portion, wherein the magnetic field generator is provided on an upper surface of the fixed portion.

22. The optical switch apparatus according to claim 21, wherein the magnetic field generator comprises a magnet, and a holder to hold the magnet.

23. The optical switch apparatus according to claim 21, wherein the magnetic field generator comprises at least two magnets, and a holder to hold the magnets, and the holder includes at least one convex portion between the at least two magnets to hold an interval between the at least two magnets.

24. The optical switch apparatus according to claim 16, wherein the shielding portion extends from the movable portion perpendicular to the movable portion, and the surface of the shielding portion is parallel to the torsional axis.

25. The optical switch apparatus according to claim 24, wherein the shielding portion has a width smaller than that of the movable portion along the torsional axis.

26. The optical switch apparatus according to claim 16, wherein the shielding portion extends from the movable portion perpendicular to the movable portion, and the surface of the shielding portion is perpendicular to the torsional axis.

27. The optical switch apparatus according to claim 16, wherein the movable portion and the shielding portion are made from silicon.

28. The optical switch apparatus according to claim 27, wherein the support portion is made from polyimide.

29. The optical switch apparatus according to claim 16, further comprising a fixed portion connected to the support portion, wherein the magnetic field generator is provided on an upper surface of the fixed portion.

30. The optical switch apparatus according to claim 29, wherein the magnetic field generator comprises a magnet, and a holder to hold the magnet.

31. The optical switch apparatus according to claim 29, wherein the magnetic field generator comprises at least two magnets, and a holder to hold the magnets, and the holder includes at least one convex portion between the at least two magnets to hold an interval between the at least two magnets.

32. A light intercepting device comprising:

a movable portion rotatable about a torsional axis;

first and second shielding portions respectively provided at both ends of the movable portion at least one of the first and second shielding portions is in a direction perpendicular to the torsional axis;

a driving wiring provided at least partially on the movable portion for selectively rotating the movable portion; and a magnetic field generator for applying a magnetic field to at least a part of the driving wiring;

wherein upon the control of the driving wiring the movable portion rotates such that at least one of the first and second shielding portions intercepts light traveling in a direction perpendicular to the torsional axis.

33. An optical switch apparatus comprising:

a movable portion rotatable about a torsional axis;

first and second shielding portions associated with the movable portion;

a driving wiring provided at least partially on the movable portion for selectively rotating the movable portion;

a magnetic field generator for applying a magnetic field to at least a part of the driving wiring;

an input-side light waveguide for inputting an input light signal;

first and second output-side light waveguides in optical communication with the input-side light waveguide, the first and second output-side light waveguides allowing first and second output light signals, respectively, to travel in a direction perpendicular to the torsional axis; and first and second gaps provided in the first and second output-side light waveguides corresponding to the first and second shielding portions, respectively;

wherein upon a selective control of the driving wiring the movable portion rotates such that one of the first and second shielding portions goes into a respective one of the first and second gaps to control the output of a respective first and second output light signal traveling therein.

* * * * *